United States Patent [19]
Bahns et al.

[11] Patent Number: 5,607,188
[45] Date of Patent: Mar. 4, 1997

[54] MARKING OF OPTICAL DISC FOR CUSTOMIZED IDENTIFICATION

[75] Inventors: Ted L. Bahns, Colfax; Bruce T. Peacock, Eau Claire, both of Wis.

[73] Assignee: Imation Corp., St. Paul, Minn.

[21] Appl. No.: 265,234

[22] Filed: Jun. 24, 1994

[51] Int. Cl.$^6$ .................................................. B42D 15/00
[52] U.S. Cl. ............................ 283/113; 283/72; 283/86
[58] Field of Search .................................. 283/86, 91, 94, 283/113, 72

[56] References Cited

U.S. PATENT DOCUMENTS

| | | | |
|---|---|---|---|
| 4,656,106 | 4/1987 | Holland et al. | 430/2 |
| 4,819,223 | 4/1989 | Gregg | 369/275 |
| 4,834,843 | 5/1989 | Koop et al. | 204/5 |
| 4,929,821 | 5/1990 | Kocznar et al. | 235/493 |
| 5,101,184 | 3/1992 | Antes | 235/454 |
| 5,267,756 | 12/1993 | Molee et al. | 283/86 |

FOREIGN PATENT DOCUMENTS

| | | |
|---|---|---|
| 2250626 | 6/1992 | United Kingdom . |
| 2277827 | 11/1994 | United Kingdom . |
| WO94/24665 | 10/1994 | WIPO . |

*Primary Examiner*—Willmon Fridie, Jr.
*Attorney, Agent, or Firm*—Eric D. Levinson

[57] ABSTRACT

Techniques for marking of optical data discs with a unique characteristic marking for purposes of identification and verification of authenticity. The marking, referred to as a 'watermark', can be a name, logo, design, picture or other pattern which is applied within the structure of the data disc. The watermark is applied to the master disc, and will therefore be reproduced in all production replica discs through the use of standard stamper and replica processes. In a preferred embodiment the watermark is a modification to the periodic diffraction grating effect created by the encoded data by alteration of the thickness or depth of the data feature with respect to the reference plane of the data structure in areas defining the watermark. The watermark can then be seen in the final disc as a discontinuity or difference in the rainbow-like diffraction pattern on the surface. In other embodiments, a hologram of the watermark is formed in zones on the disc, in the form of hologram interference patterns formed interspersed with the data features. These holograms can be viewed in the final disc, with white light in one embodiment, or with an illuminating laser in another embodiment, as virtual images of the watermark object.

13 Claims, 5 Drawing Sheets

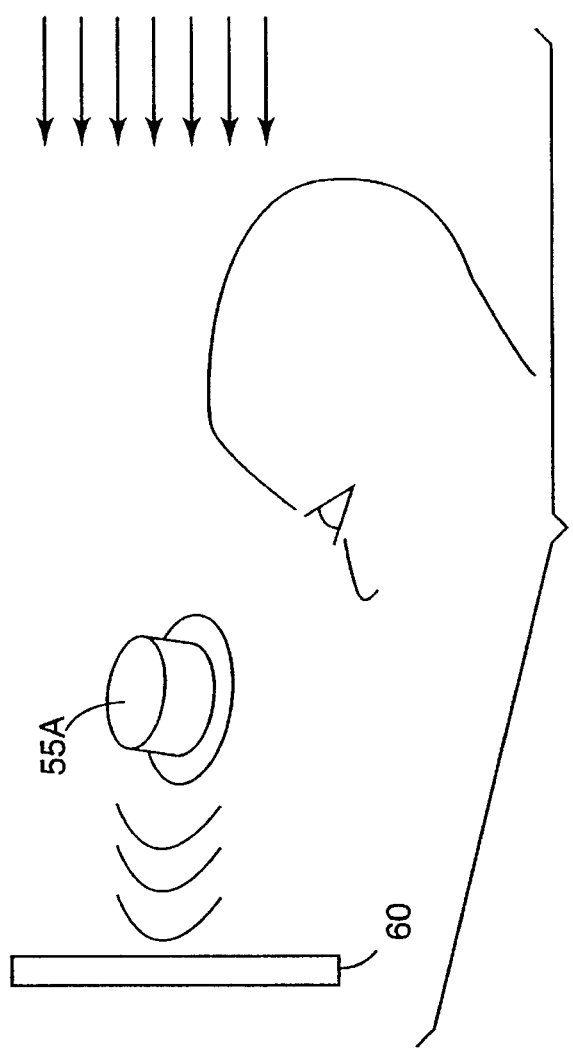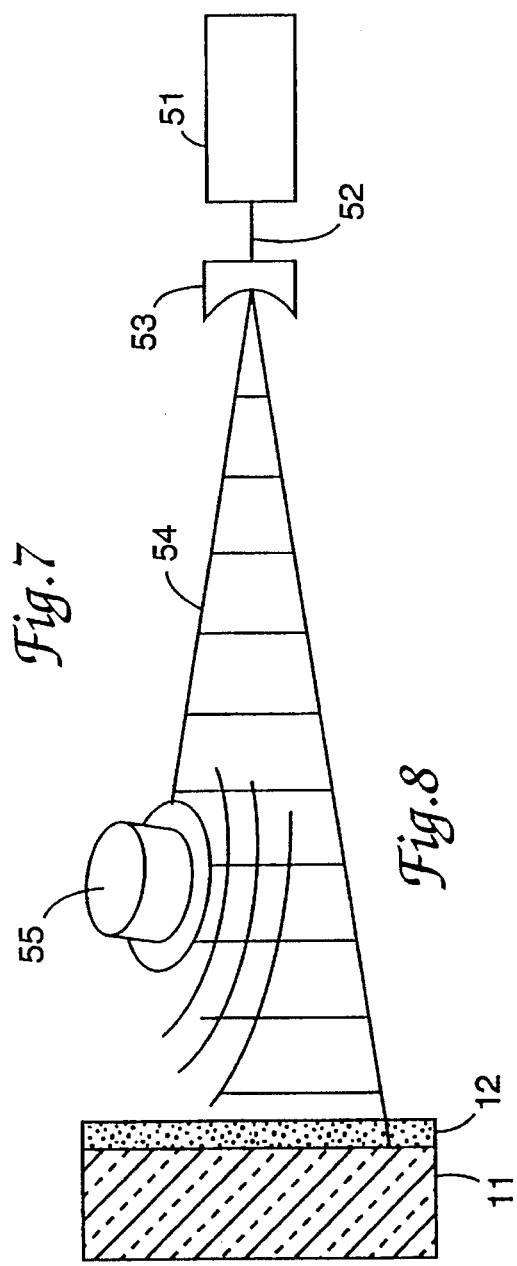

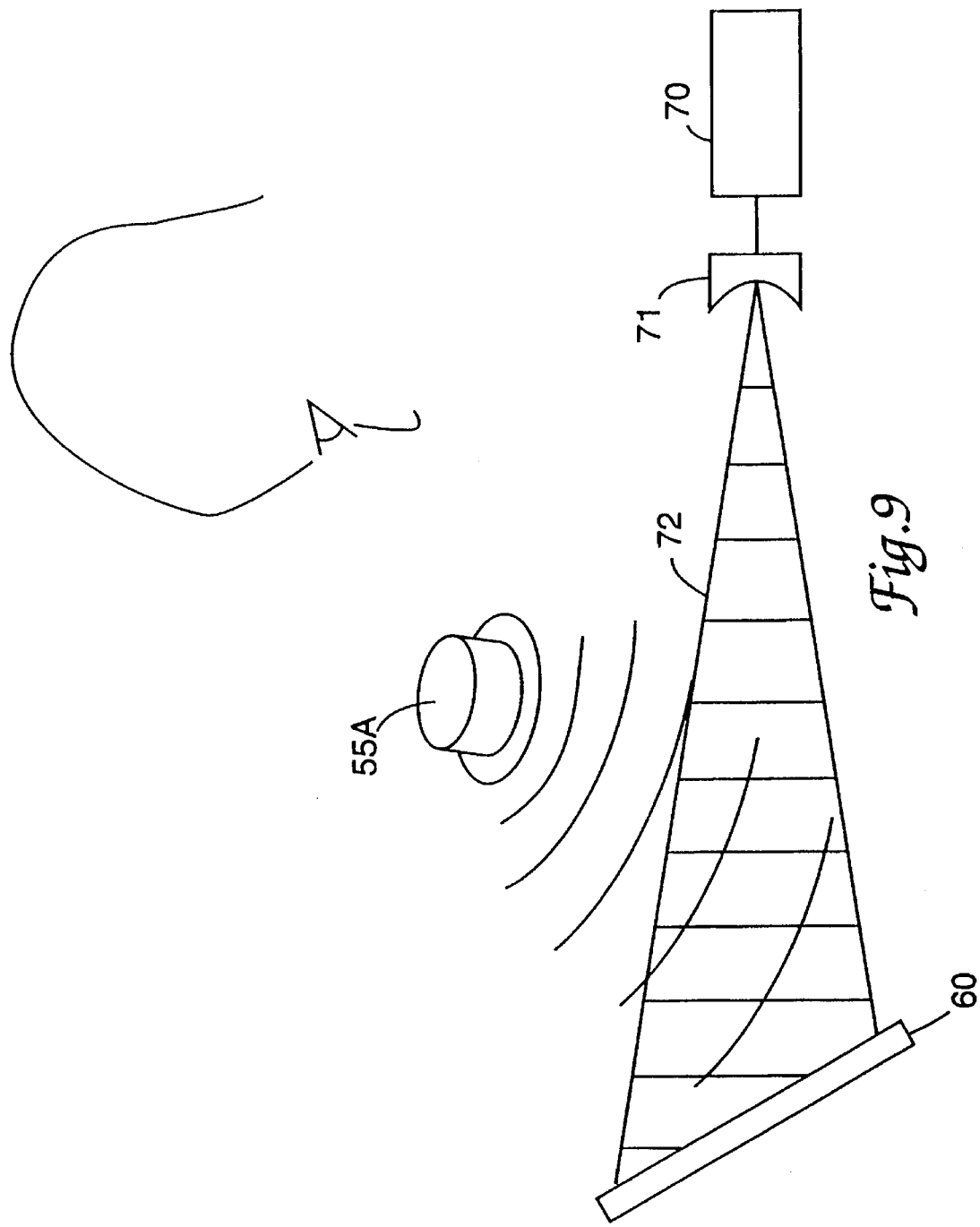

MARKING OF OPTICAL DISC FOR CUSTOMIZED IDENTIFICATION

TECHNICAL FIELD

This invention pertains generally to the field of optical data discs, and specifically to the marking of optical data discs for purposes of identification and verification of authenticity.

BACKGROUND OF THE INVENTION

Optical data discs are an increasingly popular media choice for the distribution and accessing of large volumes of data. This includes audio and video program material, as well as computer programs and data. Formats of optical data discs include audio CD, CDR, CD-ROM, Videodisc and various types of magneto-optical discs. Optical data discs are generally produced by making a master which has physical data features representing the data formed in or on a reference surface therein. The master is used to make a stamper which in turn is used to make production quantities of replica discs, each containing the data which was formed in the master. The high data capacity, convenience and relatively low cost of such discs have contributed to their great success and acceptance in the marketplace. Unfortunately, the high value of the data on a disc, the relative low cost of production of discs, and the proliferation of facilities world wide for mass-production of discs have lead to concerns about counterfeiting of discs.

It would be desirable to have a way of marking discs in a way that would identify a disc as being authentic, that is, as having been manufactured by an authorized source. Ideally, a system of marking would be easy and inexpensive to apply at the authorized disc manufacturing facility, and difficult to duplicate by an unauthorized facility.

The use of special logos or marks on the 'label' portion of a disc are not secure from duplication, as most label information is printed using standard graphic arts techniques which are easy to copy and duplicate. Coding of identification in the data on the disc is a possibility, but as 'normal' data would be duplicated by the counterfeiter, the identification data would have to be of a non-standard type or location, and this in turn would probably require special playback equipment or analysis to interpret. In other fields, such as credit cards, security has been provided by inclusion of additional layers having magnetic patterns, or inclusion of a hologram layer laminated in the card. However, it would be desirable to provide special logos or marks on optical data discs without having to provide additional layers to do so.

DISCLOSURE OF THE INVENTION

The present invention provides for authenticity marking of optical data discs wherein the marking is created within the disc itself in the form of a name, logo, pattern or picture. In one form the marking may be directly visually observed on the disc in normal everyday conditions. In another form, the marking may be not visible under normal conditions, but rendered visible through the use of special lighting or viewing conditions. The markings according to the present invention are sometimes referred to herein as a 'watermark' in the optical disc, and it will be understood that this usage is to indicate an analogy in function to a watermark in paper, but of course the techniques for forming the marks are entirely different.

The markings according to the preferred embodiment of the present invention are formed in the data structure of the disc, without requiring any additional layers or processing steps in the production of the replica discs. All the extra processing steps to form the watermark are done at the master disc level, so that the replication steps are fully standard according to existing processes. In this way the watermark will be applied to all replica discs made from the master disc.

In one preferred embodiment the watermark is interspersed with the data in the data structure of the disc as a modification to the periodic diffraction grating effect created by the data features. The thickness or depth of the data feature relationship is altered in areas of the data structure of the disc in zones defining the watermark. This can be made by selectively altering the relative height of the land areas or reference plane areas with respect to the data depressions (or bumps), in the area of the desired watermark pattern. The watermark can then be seen in the master disc and the replica disc as a discontinuity or difference in the rainbow-like diffraction pattern on the data structure.

In another preferred embodiment, a hologram of the watermark is formed in zones on the disc, in the form of hologram interference patterns formed in the structure and interspersed with the data therein. The hologram is formed on a photoresist-covered master by exposure with a laser and with reflected light from an object, a virtual image of which will be the watermark in the final disc. After development the hologram interference patterns and the encoded data patterns on the master disc are reproduced in the replica discs. These hologram watermarks can be viewed with white light, in one embodiment which uses a Denisyuk hologram, or with an illuminating laser in another embodiment which uses a deep scene hologram.

BRIEF DESCRIPTION OF THE DRAWING

FIG. 7 illustrates the arrangement for readout or viewing of the Denisyuk hologram watermark in a replica disc which was created with the arrangement of FIG. 6;

FIG. 8 illustrates the arrangement for exposure of a deep scene hologram on a disc master according to another embodiment of the invention; and FIG. 9 illustrates the arrangement for readout or viewing of the deep scene hologram watermark in a replica disc which was created with the arrangement of FIG. 8.

DETAILED DESCRIPTION OF THE INVENTION

The field to which this invention pertains includes all types of optical data discs having information contained in data structures therein as data features and a reference plane for the data features. In various formats of optical data discs, the data features may include, data pits, grooves, bumps or ridges, and lands or land areas in between. This includes current formats of audio CD, CDR, CD-ROM, and video discs as well as future formats which use data features as defined above. This definition of optical data discs also includes various types of magneto-optical discs, which commonly use data features such as grooves and pits for tracking and address identification, even though data is subsequently recorded magneto-optically in adjacent areas.

The production of optical data discs usually includes the three general steps of producing a master, one or more stampers, and the replicas, which are the final product. Although there are variations in specifics of processing steps, these three steps are almost always involved. The master is often made on a glass disc coated with photoresist, and exposed by a modulated laser beam which writes the data on the master by selectively exposing areas of the photoresist which, after development, become the optically encoded data features with respect to a reference plane which may be formed by the unexposed areas. A stamper or mold is then made from the master, having a mirror-image pattern of the data features. The stamper is then used to mass produce the replicas, by various injection molding or pressing processes. Each replica disc has the same data patterns which were originally created on the master disc (or their inverse, i.e., bumps instead of pits, depending on which side of the disc is to be read).

The present invention creates the authenticity markings on the master disc, through special processing steps described herein. Because this is done at the master level, it is not necessary to alter the steps of making the stamper and replicas, and in this way preexisting stamper and replica production operations can then be used to produce replica optical data discs having the watermark.

One embodiment of the invention uses a visible diffraction effect on the surface of the master disc to create the watermark, which will subsequently be transferred to the final optical data discs during replication. The data features on a disc give the appearance of a periodic diffraction grating, visible as the familiar rainbow patterns seen by the unaided eye. This embodiment of the invention places a unique pattern or patterns on the optical disc which can be observed as contrasting to the normal or background diffraction grating effect due to the data features, giving the watermark appearance in the selected area or areas.

Figure 1:
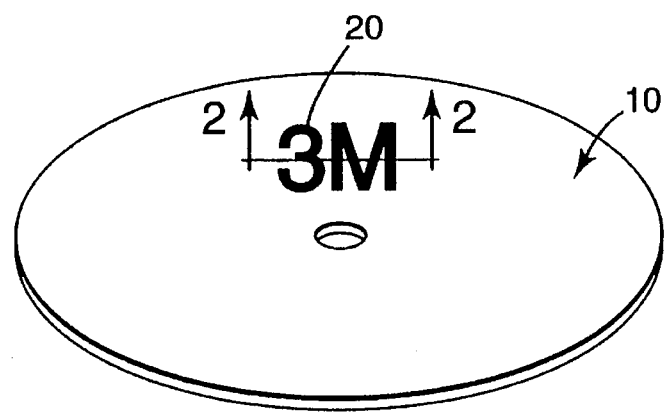
FIG. 1 is a view of an optical data disc (which could represent either a master or a replica) with a visible "watermark" according to one embodiment of the present invention.

In FIG. 1 reference number 10 indicates an optical disc, which could represent either a master disc, or a replica disc made from a stamper which was in turn made from the master. The disc 10 has a watermark 20 in the data area. For purposes of illustration, the watermark is the trademark logo "3M"; it will be understood that any type of pattern or picture could be used.

Figure 3:
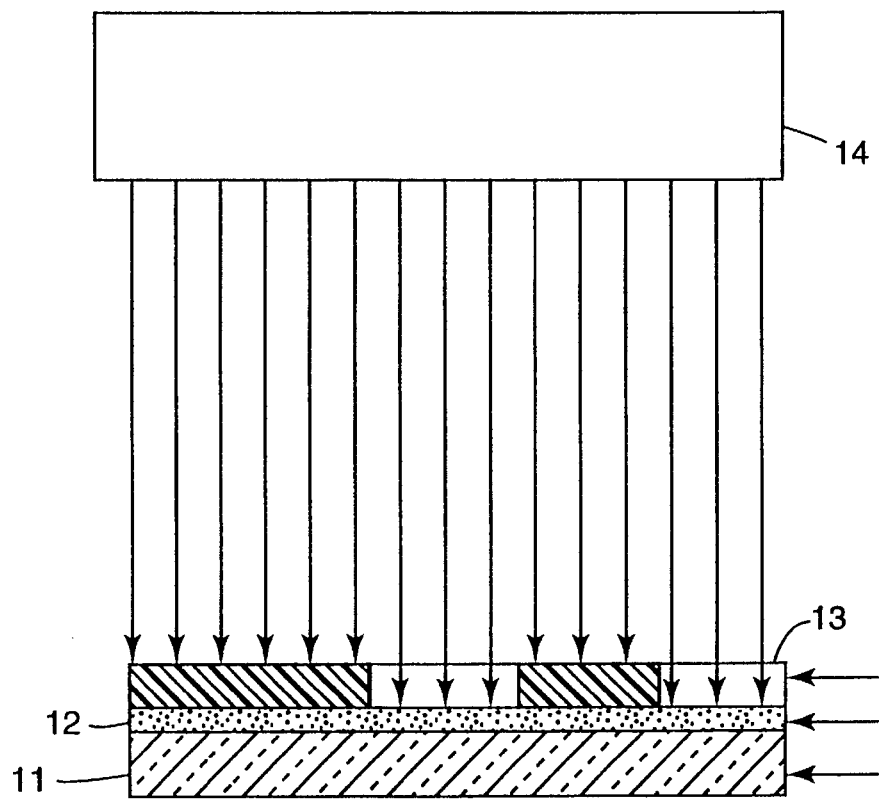
FIG. 3 is a diagram illustrating a step in the creating of the diffraction embodiment of FIG. 2.

To make a watermark as in FIG. 1 using the diffraction method, an image of the watermark is created on film, for example 3M DRC contact film, using standard graphic arts techniques. This image can be either a positive or a negative image of the logo, as either will work. A glass substrate is coated with photoresist and baked. This coated master is placed in a laser beam recorder to selectively expose small areas of the photoresist in patterns corresponding to the data features for the program material. Prior to development, the glass master 11 with photoresist layer 12 is placed in the arrangement shown in FIG. 3. The film containing the watermark is used as a mask 13 during an exposure with ultraviolet light from a source 14. The clear or minimum density areas of the mask allow UV exposure, while the maximum density areas of the mask block the UV, to create an image exposure, positive or negative, of the watermark pattern. The UV source can be a mercury vapor bulb. Control of the UV light intensity, distance or exposure time is necessary to obtain the right amount of exposure. The object is to provide enough exposure so that after development, there will be a reduction in thickness of photoresist according to the mask image, but not so much reduction as would impair the integrity of the data.

Figure 2:
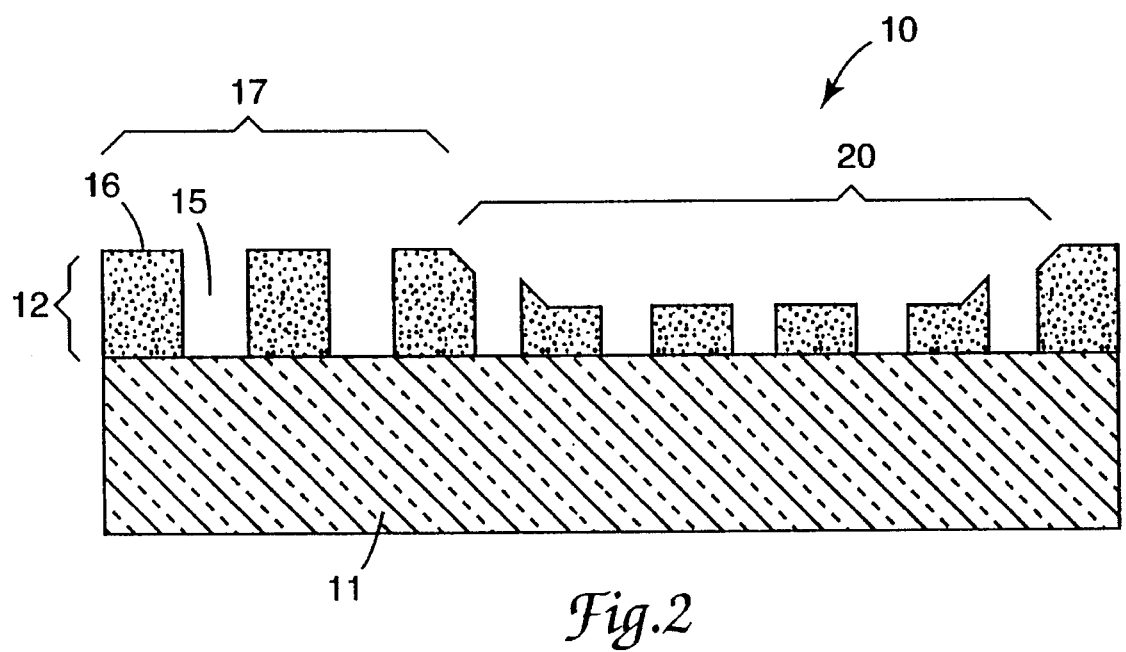
FIG. 2 is a schematic representation of a portion of the section A—A of FIG. 1, at an enlarged scale, to illustrate a diffraction embodiment of the invention.

Following normal development of the photoresist, the master disc has the watermark of the original artwork in the form of a differential pattern. This is shown in FIG. 2 which for purposes of illustration is greatly enlarged and not drawn to scale. The photoresist layer on the glass master substrate has numerous data features, which in this case are data pits 15, where the photoresist has been exposed by the laser recorder, and developed away, separated by land areas 16. The photoresist is unaltered in area 17 and most other data areas (not shown), meaning that the lands remain at the reference plane and the normal height-depth relationship of the pits and lands is maintained. However in area 20, which corresponds to a portion of the watermark logo, the thickness of the photoresist has been reduced by the exposure through the mask. Alternatively, if a positive of the watermark image was used on film in the exposure, the areas 17 would be reduced in height, and the area 20 in the watermark would remain unaltered. Either way, this creates a difference in the thickness, or in the "height" of the land areas between data features, in the watermark and non-watermark areas. This difference can be seen as a difference in the diffraction pattern of the data features, in terms of a difference or interruption in the rainbow effect of light on the disc. This is visible in the master disc, and since the replica discs will be a faithful reproduction of the master disc, it will be seen in the replica discs as well.

As mentioned above, control of the exposure through the mask is necessary to control the difference in height or thickness of the photoresist in the watermark and non-watermark areas. The difference should be the minimum that will produce a noticeable visual effect, if the watermark is applied over usable data. In practice, a difference of less than 10 nanometers can produce a visible watermark, depending on the exact shape of the data feature used. The photoresist, however, should not be reduced over data enough to interfere with readout laser interpretation of pits and lands. If the watermark is to be applied over the unused back side of a single-sided disc, or in another zone which can contain 'dummy' data, then the difference in thickness can be greater.

Other embodiments of the invention make use of holograms to form the watermark on the master disc, and on replica discs made therefrom, in the form of three-dimensional images. A hologram is a diffraction pattern created by the interference of two beams of coherent light. By interfering two beams of coherent light onto a master coated with photoresist, a unique marking can be stored on the surface of the master and replica discs. There are a number of ways to make holograms; some produce holograms which can be viewed with white light, and others produce holograms which can only be viewed using a coherent light source, e.g., a laser. Both of these types can be used in the present invention, with the choice depending on whether it is desired that the consumer can see the watermark, or whether investigative personnel can view it with special equipment.

Figure 4:
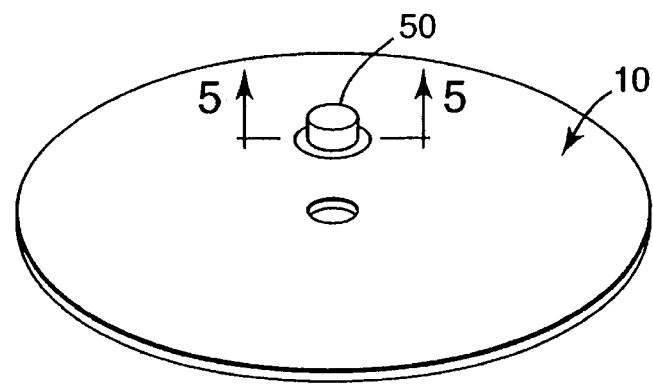
FIG. 4 is a view of an optical data disc (which could represent either a master or a replica) with a visible hologram "watermark" according to an embodiment of the present invention.

In FIG. 4 reference number 10 again indicates an optical disc, which could represent either a master disc, or a replica disc made with the master. The disc 10 has a holographic image watermark 50 in the data area.

Figure 6:
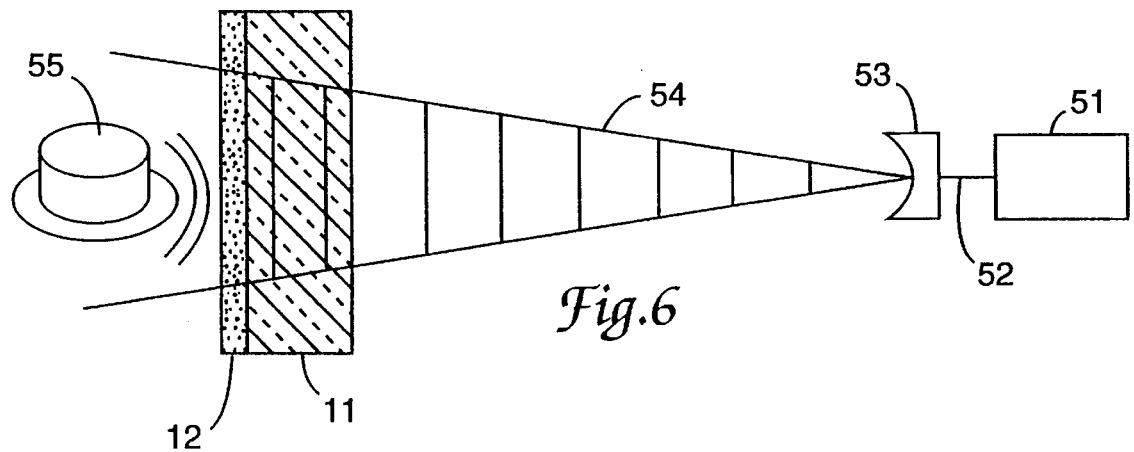
FIG. 6 illustrates the arrangement for exposure of a Denisyuk hologram on a disc master according to one embodiment of the invention.

To create a hologram which can be viewed in white light, a Denisyuk hologram preferably is used. The arrangement for exposing the master is shown in FIG. 6. The object 55 to be encoded by holography is a three dimensional object, represented in this and subsequent figures as a hat-shaped object. Any type of object can be used, to give the desired authenticity mark to the finished products. A glass master 11 is coated with photoresist and data-recorded as previously described. Laser light 54 from a laser 51 is directed through a negative lens 53 through the glass side of the master 11 to illuminate the object. Light reflected from the object falls back on the photoresist layer, and interferes with the illuminating beam to form the hologram exposure. An argon ion laser was used in one embodiment. An electronic shutter 52 can be provided to control exposure. The total energy density delivered to the master can be determined by measuring the peak laser intensity located at the master multiplied by the total exposure time. The objective is to provide the right amount of exposure to use normal development time for developing the data and the hologram on the master. In one example, with a development time of 40 seconds, the best exposure time was 6 seconds. The times in general will vary depending on the process used, and measurements or exposure trials may be needed to achieve optimum results with the equipment and process being used.

After development, a transmission hologram can be viewed for verification on the glass master with a helium neon laser (633 nm). After the stamper and replicas are made, the hologram watermark can be viewed on the replica 60 illuminated by white light, using the arrangement of FIG. 7. A virtual image 55A of the watermark object will be seen.

Figure 5:
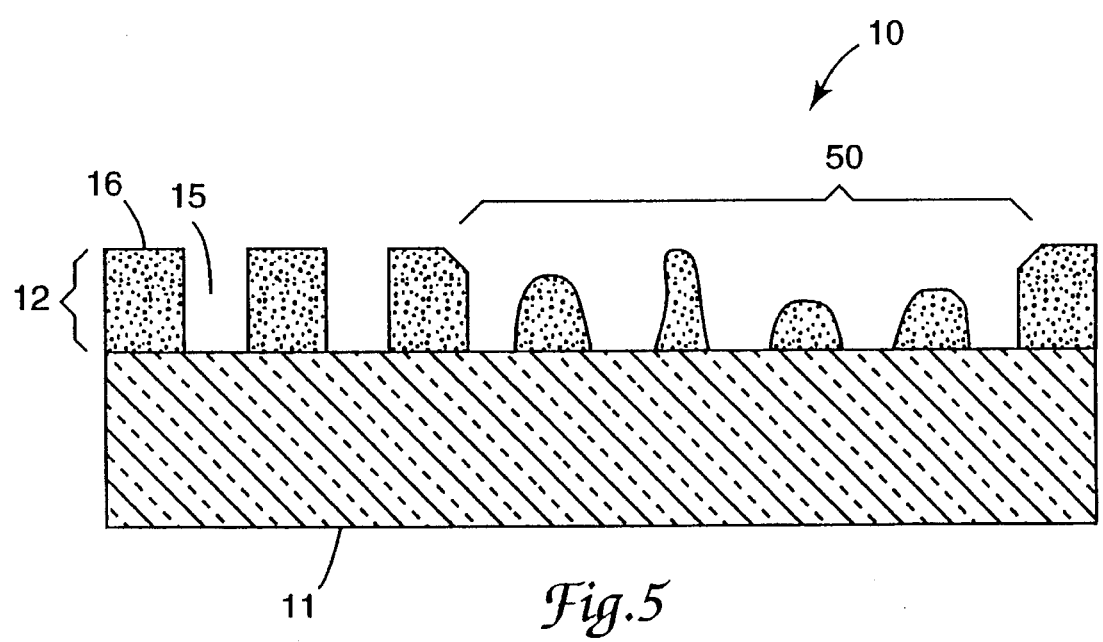
FIG. 5 is a schematic representation of a portion of the section A—A of FIG. 4, at an enlarged scale, to illustrate a holographic embodiment of the invention.

FIG. 5 is similar to FIG. 2, and illustrates the effect of formation of the hologram on the photoresist layer. For purposes of clarity of illustration, FIG. 5 is greatly enlarged and not drawn to scale. Again, in the non-watermark areas the reference plane and land areas 16 and data pits 15 are not altered by the hologram, but in the watermark area 50 the effect of the hologram can be seen. (If desired, suitable masks can be used in the exposure step of FIGS. 6 and 8 to confine the hologram to a certain area.) The land areas in the hologram zone have irregular surface shapes which are the interference patterns of the hologram. As mentioned above the hologram exposure should be controlled so as to control the depth of the interference patterns. If the hologram is applied over usable data, the depth should be the minimum that will produce a noticeable hologram image, but not enough to interfere with readout laser interpretation of pits and lands. If the hologram is to be applied over the unused back side of a single-sided disc, or in another zone which can contain 'dummy' data, then the depth can be greater.

A deep scene hologram can be produced with the arrangement of FIG. 8. The master 11 which has been coated with photoresist 12 and data-recorded is exposed with the light 54 from the laser 51 and reflected laser light from the object, to create the interference pattern. This arrangement has the advantage of recording long reflective objects which are longer than the coherence length of the laser. Longer exposure times are needed than in the previous example, to obtain the needed exposure. After development, the master can be used to make a stamper, and replicas can be produced.

Viewing of the deep scene hologram watermark on a replica is done with the arrangement of FIG. 9. Note that a deep scene hologram cannot normally be seen with white light. It is necessary to illuminate the replica with a laser 70, and a virtual image 55A of the object can then be seen. This can be an advantage if it is desired that for investigation on counterfeiting that only specially equipped enforcement personnel can detect the presence of the watermark.

The watermarked replica data discs produced according to this invention will provide a measure of identification of authenticity, and tend to discourage counterfeiting. Most counterfeit operations are believed to be primarily replication operations, and have only limited capability to produce their own masters. This will make attempted duplication of the watermark more difficult. In particular, the hologram embodiments are very difficult to reproduce, as it is very difficult to recreate from the hologram itself, the original three-dimensional object used to expose the hologram.

It is believed that the watermarks provided by the present invention, coupled with internal security in the making of masters, and possibly in changing the watermarks from time to time, will provide benefits in increased product integrity as reduction in unauthorized reproduction.

We claim:

1. An optical data disc which includes a data structure of optically readable data feature patterns which represent data stored on the disc, wherein the data feature patterns comprise data features and land areas which correspond to a reference plane and which are in between said data features, said data features and land areas being characterized by a sufficient difference in height with respect to the reference plane to allow the data feature patterns to be optically readable; and wherein the optical data disc comprises an optically viewable identification image formed within said data structure and interspersed with the data features therein, wherein the optically viewable identification image includes an alteration in said height difference between the data features and the land areas with respect to the reference plane in the area of the data structure corresponding to the optically viewable identification image sufficient to provide an altered diffraction pattern such that the optically viewable identification image is viewable to form an authentication watermark for the disc.

2. An optical data disc according to claim 1 wherein the data features include pits, and wherein the lands have a reduced height in the area of the watermark as compared to the non-watermark areas.

3. An optical data disc according to claim 1 wherein the viewable identification image includes hologram interference patterns interspersed with the data feature patterns to create a viewable hologram image as the watermark.

4. An optical data disc according to claim 3 wherein the data features include pits and wherein the hologram interference patterns are variations in height or thickness of the lands in the area of the watermark.

5. An optical data disc according to claim 1 wherein said disc is a master disc for use in the production of replica discs containing said authentication watermark image.

6. An optical data disc according to claim 1 wherein said disc is a replica disc for use containing said authentication watermark image.

7. An optical data disc according to claim 1 wherein the land areas are reduced in height in the non-watermark areas as compared to the watermark areas.

8. An optical data disc according to claim 3 wherein said hologram is a Denisyuk hologram.

9. An optical data disc according to claim 3 wherein said hologram is a deep scene hologram.

10. A method of making optical data discs having an authentication identification marking, comprising:

providing a master disc;

encoding data feature patterns in a data structure on the master disc representing the data stored thereon, wherein the data feature patterns comprise data features and land areas which correspond to a reference plane and which are in between said data features, said data features and land areas are characterized by a sufficient difference in height with respect to the reference plane to allow the data feature patterns to be optically readable; and forming an identification watermark in said data structure and at least partially coextensive with the area of the data feature patterns, wherein the optically viewable identification image is formed by providing an alteration in said height difference between the data features and the land areas with respect to the reference plane in the area of the data structure corresponding to the optically viewable identification image sufficient to provide an altered diffraction pattern such that the optically viewable identification image is viewable to form an authentication watermark for the disc.

11. The method of claim 10 further including replicating a replica disc from said master disc in a manner to reproduce the data features and the mark patterns, to reproduce the identification watermark on the replica.

12. The method of claim 10 wherein the step of forming an identification watermark comprises encoding hologram interference patterns in the areas of the data feature patterns corresponding to the watermark to form a viewable hologram of an object as the watermark.

13. The method of claim 12 wherein the step of encoding data feature patterns includes forming data pits and lands in a reference plane, and wherein the step of encoding the hologram interference patterns includes encoding said hologram interference patterns on the lands of the data feature patterns corresponding to the watermark.

* * * * *